United States Patent [19]

Chujo et al.

[11] Patent Number: 4,942,860
[45] Date of Patent: Jul. 24, 1990

[54] ENGINE CONTROL SYSTEM

[75] Inventors: Yoshiki Chujo; Tokuta Inoue, both of Mishima; Toshiaki Konomi; Yoshihiko Hyodo, both of Hyodo, all of Japan

[73] Assignee: Toyota Jidosha Kabushiki Kaisha, Aichi, Japan

[21] Appl. No.: 151,422

[22] Filed: Feb. 2, 1988

[30] Foreign Application Priority Data

Feb. 6, 1987 [JP] Japan .................. 62-024824
Feb. 6, 1987 [JP] Japan .................. 62-024827
Apr. 8, 1987 [JP] Japan .................. 62-084861

[51] Int. Cl.⁵ .......................... F02M 25/06
[52] U.S. Cl. .................. 123/571; 123/417; 123/494; 60/605.2
[58] Field of Search ........... 123/440, 417, 480, 486, 123/489, 494, 568, 569, 571, 589; 60/276, 278, 605.2

[56] References Cited

U.S. PATENT DOCUMENTS

| | | | |
|---|---|---|---|
| 4,005,689 | 2/1977 | Barnard | 60/278 X |
| 4,108,122 | 8/1978 | Barnard | 60/276 X |
| 4,191,144 | 3/1980 | Nohira et al. | 123/571 X |
| 4,300,516 | 11/1981 | Hayakawa | 123/571 |
| 4,399,791 | 8/1983 | Kobayashi et al. | 123/571 X |
| 4,426,986 | 1/1984 | Müller et al. | 123/571 |
| 4,471,745 | 9/1984 | Yoshioka et al. | 123/571 |
| 4,614,175 | 9/1986 | Asayama | 123/571 |
| 4,705,009 | 11/1987 | Asayama | 123/571 |
| 4,727,849 | 3/1988 | Nishida et al. | 123/571 |

FOREIGN PATENT DOCUMENTS 55-75548  6/1980  Japan .
0247839  11/1986  Japan .

Primary Examiner—Willis R. Wolfe
Attorney, Agent, or Firm—Kenyon & Kenyon

[57] ABSTRACT

An engine control system having an oxygen density sensor arranged in an intake system at a position downstream of a throttle valve for detecting the amount of air newly introduced into the engine. The sensor is a limit electric current detection type capable of detecting a continuously changing density of the oxygen. An amount of fuel to be injected is calculated in accordance with the output level of the sensor by using mapped data of the output level of the sensor signal. A precise detection of new air is made possible while maintaining the advantages of the known D-J system. An ignition timing also may be calculated by the signal from the oxygen sensor.

16 Claims, 10 Drawing Sheets

CRANK ANGLE
(INTAKE STROKE)
TDC    BDC

IGNITION
CALCULATION

IGNITION SIGNAL $t_o$   $t_i$   $t_e$

Tp

CRANK ANGLE

IGNITION CALCULATION

IGNITION SIGNAL

ENGINE CONTROL SYSTEM

BACKGROUND OF THE INVENTION

1. Field of the Invention

The present invention relates to an engine control system for controlling an engine operating condition such as a fuel injection amount or an ignition timing.

2. Description of the Related Art

Known in the prior art is a D-J type fuel injection system for an internal combustion engine wherein an intake pressure sensor is arranged in an intake line of the engine at a position downstream from a throttle valve for detecting an intake pressure as a parameter of an engine load. The detection of the intake pressure and an engine speed enables the detection of an amount of intake air introduced to the cylinder bore. A fuel injection amount is determined by the detected intake air amount, to maintain a designated air-fuel ratio value, and this amount of fuel is injected from the injector. This D-J type fuel injection system is advantageous in that the size of the sensor can be reduced, allowing a decrease in the air flow resistance, compared with an L-J type fuel injection system wherein a relatively large air flow meter is arranged in an intake passageway for detecting the intake air amount.

Contrary to the L-J type fuel injection system, this D-J type fuel injection system detects the amount of air introduced into the engine indirectly from the value of the intake pressure. This means that the sensor has the same output level value for the amount of newly introduced air when only air is introduced into the engine and when a gas, for example, an exhaust gas, other than the air is introduced into the engine. Therefore, when the exhaust gas re-circulation operation is carried out, it is necessary to compensate the detected output value of the sensor, to obtain a correct amount of new air introduced into the engine, if the map is appropriate for EGR operation. To this end, a system is disclosed in Japanese Unexamined Patent Publication No. 55-75548 wherein a fixed dimension orifice is arranged in an exhaust gas re-circulation passageway, and a pressure sensor is arranged for detecting a pressure drop across the orifice. This detected pressure drop is utilized for correcting the output value of the intake pressure sensor, and thereby to determine a precise value of the newly introduced air.

Nevertheless, this improved system has a drawback in that the precise amount of the new air cannot be determined, since it is not possible to directly detect the amount of new air. This causes a drawback in that a quick control of an air-fuel ratio of the target air-fuel ratio can not be obtained during a transient state of the engine.

SUMMARY OF THE INVENTION

An object of the present invention is to provide a system capable of directly detecting an amount of newly introduced air while retaining the above mentioned advantage of the D-J type fuel injection system.

According to the present invention, an internal combustion engine is provided comprising:

an engine body;

an intake system connected to the engine body for an introduction of air thereto, the system including a throttle valve for controlling the amount of air introduced;

an exhaust system connected to the engine body for a removal of resultant combustion gas therefrom;

sensor means arranged in the intake system at a position downstream of the throttle valve, said sensor being responsive to the oxygen partial pressure of the introduced air and providing an electric signal indicating the amount of air introduced;

calculating means, responsive to the sensed amount of the air introduced, for calculating the value of an engine operational characteristic to be controlled by the introduced air, and;

control means, responsive to the calculated engine operating characteristic value, for controlling the engine operational characteristics.

DESCRIPTION OF THE PREFERRED EMBODIMENT

Figure 1:
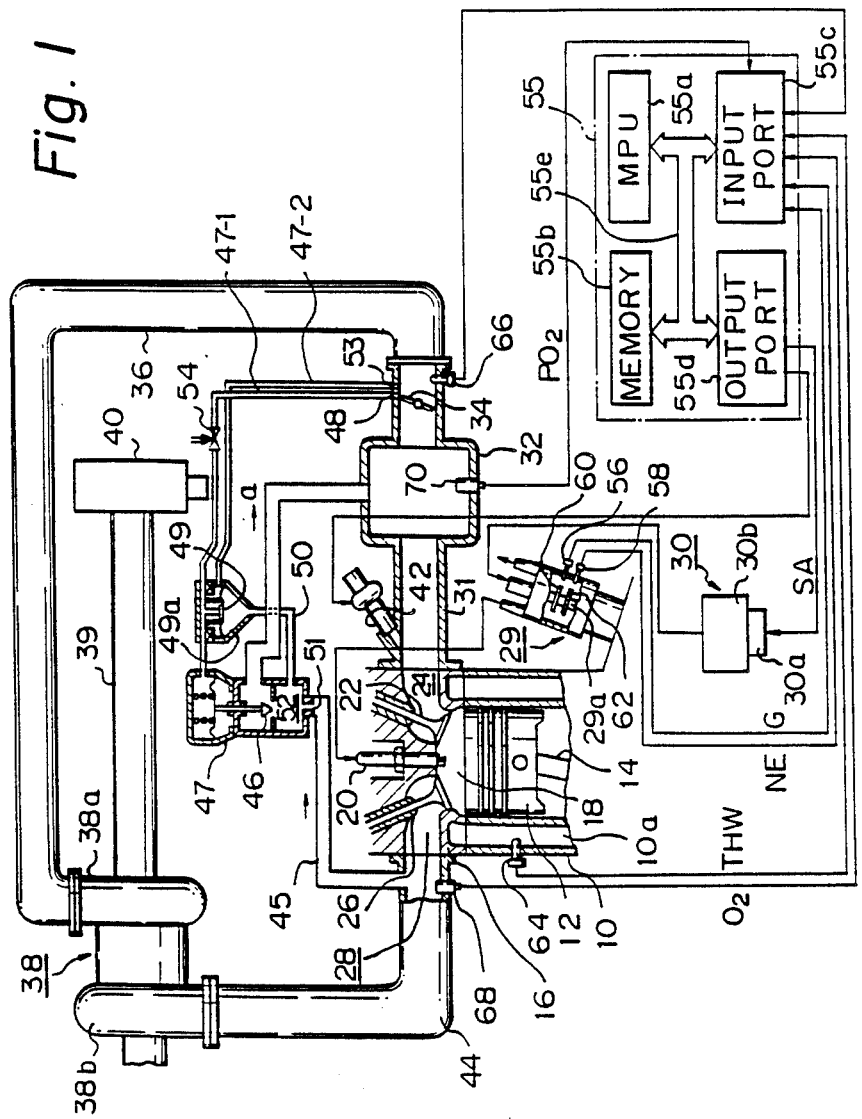
FIG. 1 is a schematic view of an internal combustion engine according to the present invention.

In FIG. 1, reference numeral 10 denotes a cylinder block, 12 a piston, 14 a connecting rod, 16 a cylinder head, 18 a combustion chamber, 20 a spark plug, 22 an intake valve, 24 an intake port, 26 an exhaust valve, 29 a distributor, and 30 an ignition device. The ignition device 30 comprises an ignitor 30a and an ignition coil 30b. The intake port 24 is connected, via an intake pipe 31, surge tank 32, throttle valve 34, intake pipe 36, and compressor housing 38a of a turbocharger 38, to an air cleaner 40. A fuel injector 42 is arranged in the intake pipe 31 adjacent to the intake port 24. The exhaust port 28 is connected, via an intake manifold 44, to a turbine housing 38b of the turbo-charger 38. It should be noted that the present invention may be applied to a system where a mechanically operated super-charger is employed instead of the turbo-charger 38.

Reference numeral 45 designates an exhaust gas re-circulation (EGR) passageway for connecting the exhaust manifold 44 to the surge tank 32. An EGR valve 46 is located in the EG passageway 45 for controlling a ratio of the amount of re-circulated exhaust gas to the total amount of gas introduced into the the EGR valve 46 is provided with a vacuum actuator 47 connected, via a vacuum passageway 47-1, to a vacuum taking out port (so-called EGR port) 48 located slightly upstream of the throttle valve 34 when in the idling position. The EGR passageway 45 is provided with an orifice 51 at a position upstream of the EGR valve 46 in the direction of the flow of the exhaust gas, as shown by an arrow a. A constant pressure chamber 52 is formed between the EGR valve 46 and the orifice 51. Reference numeral 49 denotes a pressure control valve having a diaphragm 49a connected to the constant pressure chamber 52 by a pressure passageway 50. The pressure control valve 49 is responsive to the exhaust gas pressure in the constant pressure chamber 52 for selectively opening the passageway 47-1 to the atmosphere to control the vacuum level in the actuator 47 opened to the EGR port 48, so that a substantially constant value of the exhaust gas pressure in the chamber 52 is maintained, as well known to those skilled in this art. Furthermore, the diaphragm 49a of the pressure control valve 49 is opened, via a passageway 47-2, to a vacuum port 53 located slightly above the EGR port 48, so that a vacuum force is applied to the diaphragm 49a on one side thereof remote from the other side on which the exhaust gas pressure from the constant pressure chamber 52 is applied. As a result, control of the EGR ratio in accordance with engine load is realized. It should be noted that a type of EGR system other than shown may be employed.

Reference numeral 55 denotes a control circuit constructed as a micro-computer system for attaining various engine control operations, such as a fuel injection control and ignition control. The control circuit 55 includes a micro-processing unit (MPU) 55a, memory 55b, input port 55c, output port 55d, and bus 55e interconnecting these elements. The input port 55c is connected to sensors for detecting various engine operating conditions. Crank angle sensors 56 and 58, which are Hall elements, are mounted on the distributor 29. The first crank angle sensor 56 is mounted on the distributor housing and faces a magnet piece 60 on a distributor shaft 29a so that a pulse signal is issued for every 720 degree rotation of the crank shaft, corresponding to one complete cycle of the engine, which signal is used as a reference signal. The second crank angle sensor 58 is mounted on the distributor housing and faces a magnet piece 62 on a distributor shaft 29a so that a pulse signal is issued for every 30 degree rotation of the crank shaft, which signal is used for determining an engine speed and for triggering engine operating systems such as the fuel injection and ignition control systems. An engine water temperature sensor 64 is connected to the cylinder block 10 to detect the temperature THW of the engine cooling water in a water jacket 10a; an intake air temperature sensor 66 is mounted to an intake pipe to detect the temperature THA of the intake air introduced into the engine; and a first (or exhaust side) oxygen sensor 68 is mounted to the exhaust manifold 44 for a feedback control of the air-fuel ratio, as well known to those skilled in this art. The exhaust side sensor 68 is an $O_2$ sensor where the air-fuel ratio is to be controlled to a theoretical air-fuel ratio, or a lean sensor where the air fuel ratio is to be controlled to an air-fuel ratio which is on the lean side of the theoretical air-fuel ratio.

According to the present invention, a second (intake side) oxygen sensor 70 is mounted on the surge tank 32. This second sensor 70 is used for detecting an oxygen partial pressure which is proportional to the amount of air newly introduced into the engine. The detection of the oxygen partial pressure allows the value of the amount of newly introduced air to be detected without affect by the re-circulated exhaust gas and re-circulated blow-by gas introduced into the intake system and mixed with the newly introduced air. The intake side sensor 70 has the same construction as that of the lean sensor. This type of sensor issues an electric signal having a level which changes continuously in accordance with the change in the oxygen partial pressure in the total gas introduced into the engine.

Figure 2:
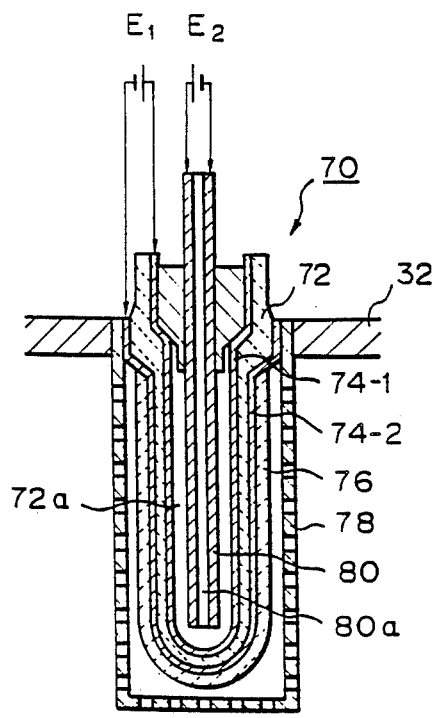
FIG. 2 is a cross-sectional view of an intake side oxygen sensor in FIG. 1.

FIG. 2, the intake side sensor 70 includes, essentially, a tubular member 72 having a closed bottom made of a solid dielectric material such as zirconium, electrodes 74-1 and 74-2 composed of air permeable films formed on the inside and outside surfaces of the member 72, a perforated diffusion layer 76 formed on the outer electrode 74-2 by plasma thermal spraying of a ceramic material such as spinel, outer casing 78 formed by a perforated plate, and a tubular shaped ceramic heater 80 arranged in a space 72a formed inside of the tubular member 72. The space 72a is opened to the atmosphere via a central passageway 80a in the heater 80.

The heater 80a is connected to an electric source $E_2$ for activating the sensor 70. An electrical source $E_1$ is connected between the inside electrode 74-1 as a positive electrode and the outside electrode 74-2 as a negative electrode, and a pumping effect takes place which allows ionized oxygen $O_2$ in the detected gas to flow from the outside electrode 74-2 to the inside electrode 74-1 at a rate determined by the characteristic of the diffusion layer 76. As a result, an ion electric current I is obtained which, at a certain voltage of the electric source $E_1$, is expressed by $$I=((4F\times S\times DO_2\times P)/(R\times T\times L))\times(lN(1/(1-PO_2/P))),$$

where F is the Faraday constant, S is an area of the electrode, $DO_2$ is a gas diffusion constant, R is a gas constant, T is a temperature, L is an effective length of the diffusion layer, P is a total pressure, and $PO_2$ is an oxygen partial pressure, respectively.

Figure 3A:
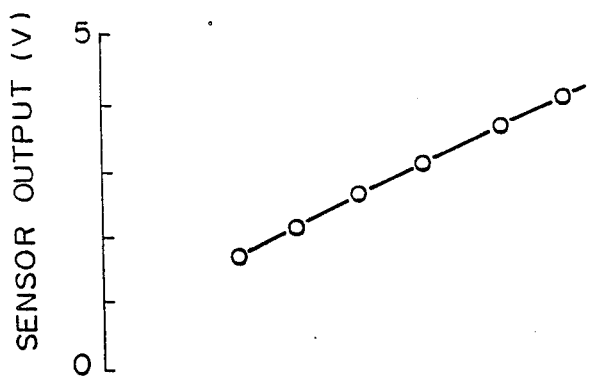
FIGS. 3(a) and 3(b) show the relationship between total pressure, and output of the sensor and oxygen pressure, respectively.
Figure 3B:
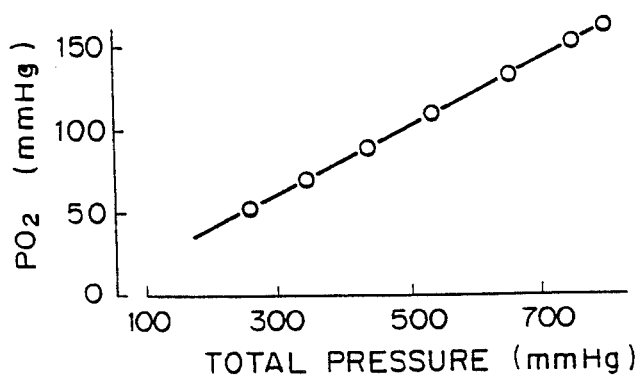

FIGS. 3(a) and 3(b) illustrate, with respect to the total pressure of gas to be detected as designated, characteristics of the output voltage of the sensor 70 and the oxygen partial pressure, respectively. As will be understood, the change in the value of the total pressure of the gas to be detected causes a change in the value of the oxygen partial pressure, and in the output voltage value of the sensor 70. Therefore, it is possible to detect the oxygen pressure from the sensor output voltage level.

The detection of the partial pressure of oxygen by the intake side sensor 70 according to the present invention allows, whether or not the exhaust gas recirculation is carried out, the basic fuel injection amount to be calculated correctly from a single map of data of a basic fuel injection amount for an engine condition where EGR is carried out. This allows a simplified construction because it is possible to eliminate the use of a map for a condition with no EGR. The reason for this will be explained hereinafter. As will be described later, there is, however, a slight non linear relationship between the value of the total pressure of gas introduced into the engine and output $PO_2$ value of the oxygen sensor 70, corresponding to the partial pressure of oxygen. This means that the basic fuel injection amount during a no EGR condition calculated from the map for an EGR condition is slightly different from the desired value, which will cause the air-fuel ratio to be deviated from the target value during a transient state of the engine. This deviation of the air-fuel ratio is, according to the present invention, negligibly small.

Figure 4:
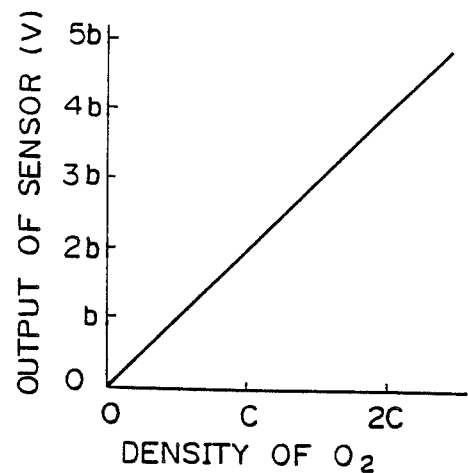
FIG. 4 shows the relationship between oxygen density and output level of the oxygen sensor.
Figure 5:
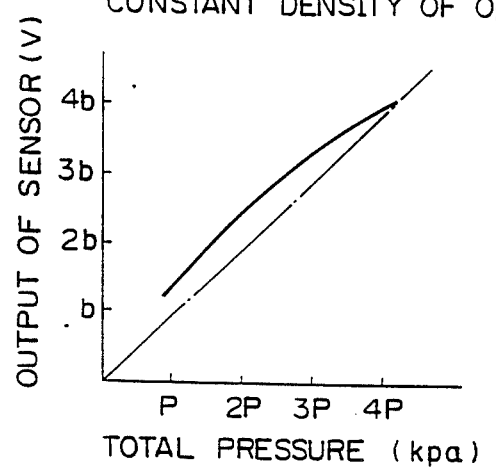
FIG. 5 shows the relationship between total pressure and output level of the oxygen sensor.

FIG. 4 shows a relationship between the density of the oxygen and the output voltage of the intake side sensor 70 when a constant total pressure is maintained. FIG. 5 shows a relationship between the total pressure and the output voltage of the intake side sensor 70 when a constant oxygen density is maintained. As will be easily seen, a slight degree of non-linearity exists in the latter relationship between the total pressure and the sensor output. Now, the affect of this non-linear of the intake side sensor 70 will be discussed.

As will be easily understood from FIGS. 4 and 5, a following experimental function will be appropriate for expressing a relationship between the output level V, total pressure P, and oxygen density C, $$V = A \times P^y \times C \tag{1}$$

where A is a constant and y is a pressure dependent factor. The oxygen partial pressure is expressed by the following equation, $$PO_2 = P \times C \tag{2}$$

where P is the total pressure and C is density. When the EGR operation is carried out, the oxygen density C, even if the $PO_2$ is maintained at the same value, is decreased to $$C(1-X) \tag{3}$$

in accordance with the amount of the exhaust gas re-circulated, where X is a ratio of the amount of the exhaust gas re-circulated to the total amount of gas introduced into the engine, i.e., the EGR ratio, causing the out value of the intake side sensor V to be varied.

In order to determine the basic fuel correctly in accordance with the $PO_2$ value, the sensor 70 must have a single value of V to the same value of $PO_2$. The above fact that the output voltage V with respect to the same value of $PO_2$ is changed between the conditions with EGR and without EGR means that the output voltage V does not strictly correspond to the newly introduced amount of air to be sensed. This means that maps of a basic fuel injection amount with respect to the oxygen density $PO_2$ are required for EGR and non-EGR operations, respectively, from the viewpoint of obtaining a target air-fuel ratio irrespective of the EGR operation. The effect of the EGR operation on an output voltage V of the intake side sensor 70 of the limit electric current type is, however, relatively small.

Now, this effect of the EGR will be discussed. When the EGR operation is carried out, the output voltage $V_{EGR}$ is calculated, from the equations (3) and (4), by the following equation.

$$V_{EGR} = A \times (PO_2)^y \times c(1-X)^{1-y} \tag{5}$$

The rate of change of the output voltage of the sensor 70 when the EGR operation is carried out to that when the EGR operation is not carried out is expressed by the following equation.

$$V_{EGR}/V = (1-X)^{1-y} \tag{6}$$

According to experiments, the pressure dependent factor has a value of between 0.8 to 0.9, so that the following equation is satisfied.

$$V_{EGR}/V < (1-X)^{0.2} \tag{7}$$

Since the EGR ratio has, at most, a value of 20% (X=0.2), the rate of change in the value of the sensor output voltage V when the EGR operation is carried out is, at most, 4 to 5% of the output voltage value under the non EGR operation. Therefore, the degree of inaccuracy in the detected oxygen density (new air amount) will be small even if the basic fuel injection amount during the non-EGR operation is calculated from the $PO_2$ to NE map for an EGR operation. This inaccuracy is not important from the viewpoint that a non EGR operation condition corresponds to an engine cooling condition wherein a fuel enrichment correction is carried out to increase the injected fuel amount from the basic amount when the engine is cold. Furthermore, the EGR operation is usually commenced after the engine has warmed up, and therefore, the basic fuel injection amount can be calculated from the map which is most appropriate.

Figure 6:
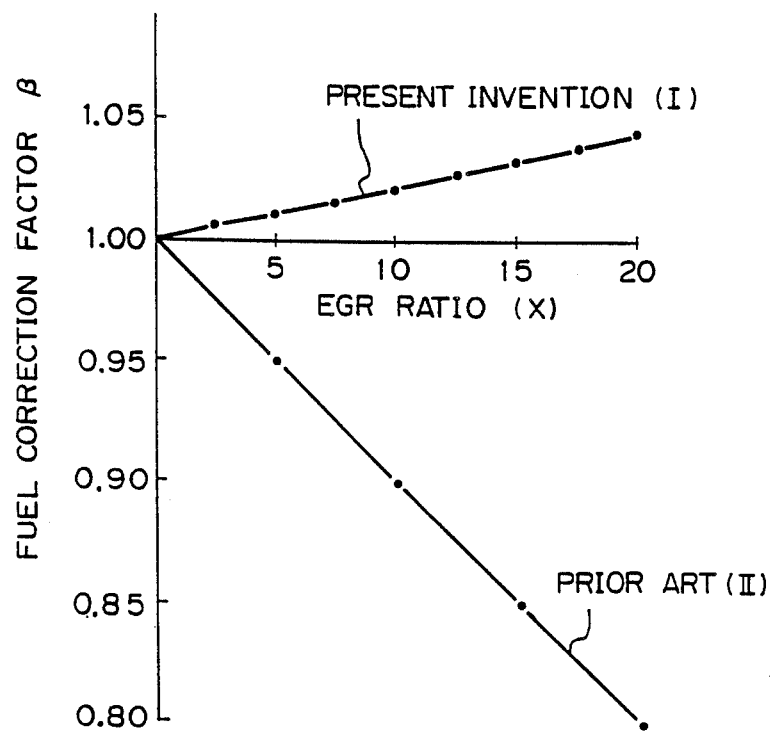
FIG. 6 shows the relationships between EGR ratio and value of the fuel correction factor for the present invention and the prior art, respectively.

FIG. 6 shows, according to the present invention, at line I, a relationship between the value of the EGR ratio and the value of the fuel amount correction factor to be multiplied by the basic fuel amount during a non EGR operation, to obtain the corrected basic fuel amount during the EGR operation from the output voltage value V of the sensor 70 when the output voltage is maintained at a constant value. In this discussion, it should be noted that a map of the basic injected fuel amount for a non-EGR operation is used for calculating the basic fuel amount for the EGR operation. As will be seen from the line I, a necessary amount of correction of the fuel amount is small if the "wrong" map, which is not matched to the engine condition, is utilized for calculating the basic fuel injection amount. In FIG. 6, a line II shows a relationship between the value of the EGR ratio and the fuel correction factor to be multiplied by the basic fuel amount calculated from a basic fuel map for a non-EGR operation, for obtaining the corrected basic fuel amount during the EGR operation in a conventional system, wherein the intake pressure is detected for calculating the basic fuel amount. In this case, the change in the output voltage from the intake pressure sensor is expressed by the following equation.

$$V = 1 - x.$$

As will be easily understood, if the curves I of the present invention and II of the prior art are compared, in the prior art it is necessary to effect a correction of the fuel amount if a single map is used for the non-EGR operation and the EGR operation, in order to obtain the appropriate basic fuel amount, since the inaccuracy of the calculated basic amount value becomes large when the engine is under an operation wherein the single map is not designated. Contrary to this, according to the present invention, a single map can be successfully used even if the engine is under an operation not designated by the map, because a necessary fuel correction amount is itself negligibly small. This allows the software construction of the control circuit 55 to be simplified.

Figure 7:
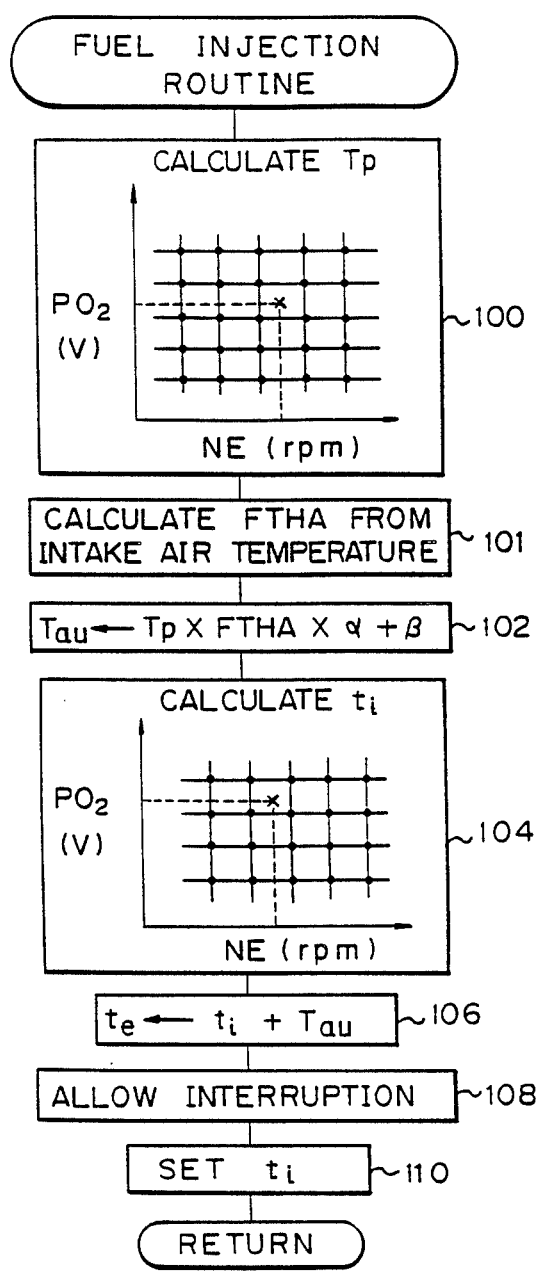
FIGS. 7 and 8 are flowcharts illustrating the fuel injection operations in a control circuit in FIG. 1.

The MPU 55a executes a calculation in accordance with programs and data stored in the memory 55b to set data in the output port 55d. The output port 55d is connected to the fuel injectors 42 and the ignitor 30a, and other control units to which the control signals from the output port 55d are applied Now, the operation of the control circuit 55 in relation to the fuel injection operation will be explained with reference to the flowcharts in FIGS. 7 and 8. FIG. 7 illustrates a fuel injection routine which is commenced by detecting a crank angle before a fuel injection timing of a particular cylinder for executing a next fuel injection. When the fuel injection is to be executed during the intake cycle, a timing of 60 degrees before top dead center (TDC) during the intake stroke is, for example, detected for commencing the fuel injection calculation. This detection is attained by a counter which is cleared by a detection of a 720 degrees CA signal from the first crank angle sensor 56 and is incremented by a detection of a 30 degrees CA signal from the second crank angle sensor 58. At step 100, a basic fuel injection period Tp is calculated from the values of the engine speed NE and output value $PO_2$ of the oxygen sensor 70. This basic fuel injection period corresponds to a period for which an injector 42 is open, to provide an amount of injected fuel with respect to the amount of newly introduced air so as to provide a theoretical air-fuel ratio. Since the volumetric efficiency changes as the engine speed changes, the basic fuel injection amount is determined not only by the amount of newly introduced air but also by engine speed, to obtain a correct desired air-fuel ratio irrespective of a change in the volumetric efficiency. In the D-J type prior art air fuel injection system, the amount of newly introduced air is indirectly detected by detecting the intake pressure, and the basic fuel amount is calculated from a combination of the values of engine speed and the intake pressure. According to the present invention, however, the basic fuel injection amount value is determined by a combination of the values of the output voltage $PO_2$ of the intake side oxygen sensor 70 corresponding to an amount of new air, and the engine speed. The memory 55b is provided with a map of data of a basic fuel injection period Tp for obtaining the theoretical air-fuel ratio with respect to combinations of the values of the engine rotational speed and the output voltage level $PO_2$ of the oxygen sensor 70. The MPU 55a executes a map interpolation calculation from an actual value of the engine speed NE detected by adjacent 30 degree CA signals from the second crank angle sensor 58 and the actual value of the output voltage $PO_2$ of the intake side oxygen sensor 70, to obtain a value of the basic fuel injection period.

At step 101, a calculation of a correction factor FTHA is effected to correct the basic fuel amount Tp calculated at step 100 in accordance with the intake air temperature THA. In a usual L-J type fuel injection system, wherein an intake air amount is detected with regard to volume, a correction of a detected value in accordance with the intake air temperature is necessary to detect the precise amount of new air when the intake air temperature is changed, because such a change in the intake air temperature causes a thermal change of the intake air volume. The correction at the step 101 in the present invention is, in meaning, different from that in the known L-J system. The present invention, wherein the oxygen partial pressure is detected by the oxygen sensor 70, basically ensures that the detected values not affected by the intake air temperature, because a change in the intake air temperature causes a corresponding change in the air density, causing the output level to be correspondingly changed, and thus causing the fuel injection amount to be controlled correspondingly. A linear relationship between the intake air temperature and output level of the oxygen sensor 70 is, however, not necessarily obtained, due to various possible reasons. One reason will be described below.

To bring the oxygen sensor to an activated condition, it is necessary to maintain the temperature around the electrodes at about 700° C. A usual degree of change in atmospheric air temperature is, for example, 10° to 30° C. This small change in air temperature has only a small effect on the temperature around the electrodes of the sensor 70, which determines the output level thereof. Thus, the actual change of the value of the sensor output voltage is smaller than it should be when the intake air temperature is changed. This means that there is a substantial inaccuracy, even if small, of the amount of intake air when the intake air temperature is changed, causing the air-fuel ratio to be deviated from the target air-fuel ratio. In order to maintain the target air-fuel ratio irrespective of the changed intake air temperature, in the present invention, a correction factor FTHA is calculated in accordance with the intake air temperature, which factor is multiplied by the basic fuel injection amount Tp.

Figure 9:
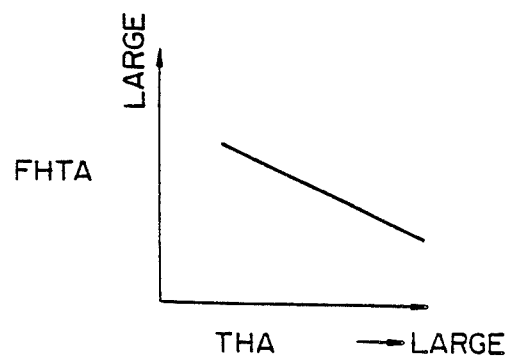
FIG. 9 shows the relationship between intake air temperature and air temperature correction factor.

FIG. 9 indicates a relationship between the temperature and the values of the correction factor FTHA. It will be easily seen that the value of the correction factor decreases as the intake air temperature THA increases, i.e., the density of the air decreases. This relationship is stored in the memory 55b as a map. The MPU 55a executes a map interpolation calculation to obtain a value of the correction factor FTHA corresponding to a detected value of the intake air temperature THA detected by the intake air temperature sensor 60. It should be noted that Japanese Unexamined Patent Publication No. 57-68533 discloses a correction of the fuel injection amount in accordance with temperature of intake air in a D-J system. This prior art intends to compensate the air-fuel ratio caused by a change in the intake pressure due to a change in the density of the intake air, which is completely different from the present invention in principle.

Again in FIG. 7, at step 102, a value of a final injection amount Tau is calculated by $$Tau + Tp \times FTHA \times \alpha + \beta$$

where $\alpha$ and $\beta$ generally show correction factors and corrections indicating various correction processes for correcting the basic fuel injection amount, which include, for example, a feedback correction calculated from the air-fuel ratio calculated by an air-fuel signal from the exhaust side sensor 68, a water temperature correction calculate by a water temperature signal from the temperature sensor 64, and an acceleration enrichment correction. These are not explained in detail since they are not directly related to this invention.

Figure 10A:
FIGS. 10(a), 10(b) and 10(c) are timing charts illustrating the fuel injection operation of the control circuit in FIG. 1.
Figure 10B:

At step 104, a timing $t_i$ for starting the fuel injection is calculated. The timing $t_i$ is determined in accordance with the engine operating characteristics in such a manner that, for example, the fuel injection is completed substantially synchronously with the timing of the completion of the intake stroke. This means that the timing for starting a fuel injection should be varied in accordance with the amount of new air and the engine speed. The memory 55b is provided with a map of data of the timing for starting a fuel injection as values of the crank angle from the top dead center at the intake stroke with respect to combinations of values of the output level $PO_2$ and the engine speed. The MPU 55a executes a map interpolation calculation to obtain $t_i$ as a time from the present time $t_0$, from the actual value of the output level $PO_2$ of the intake side sensor 70 and the actual engine speed NE as an interval between adjacent pulse signals from the second crank angle sensor 58. See FIGS. 10(a), (b) and (c).

At step 106, a time $t_e$ for finishing the fuel injection is calculated by adding the fuel injection starting time $t_i$ to the fuel injection period Tau calculated at step 102. At step 108, a time coincidence interruption is allowed, and at step 110, the time for starting the fuel injection $t_i$ is set to a not shown comparator, to control the fuel injection.

Figure 8:
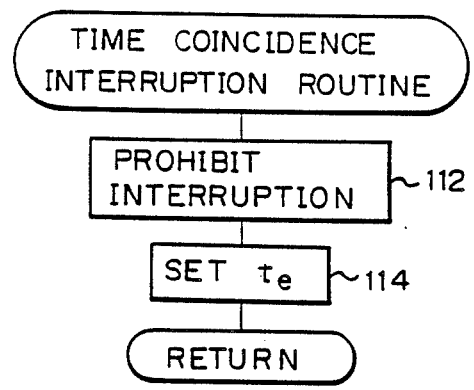

When the present time coincides with the set time $t_i$, a signal is sent to open the injector 42 and start the fuel injection operation. At the same time, a time coincidence interruption routine in FIG. 8 is commenced. At step 112, the time coincidence interruption routine is prohibited and, at step 114, the time $t_e$ is set to the comparator. Therefore, when the present time coincides with the set time $t_e$, the fuel injection by the injector 42 is stopped.

The ignition control operation of the control circuit 55 now will be described with reference to the flow-charts in FIGS. 11 and 12.

Figure 11:
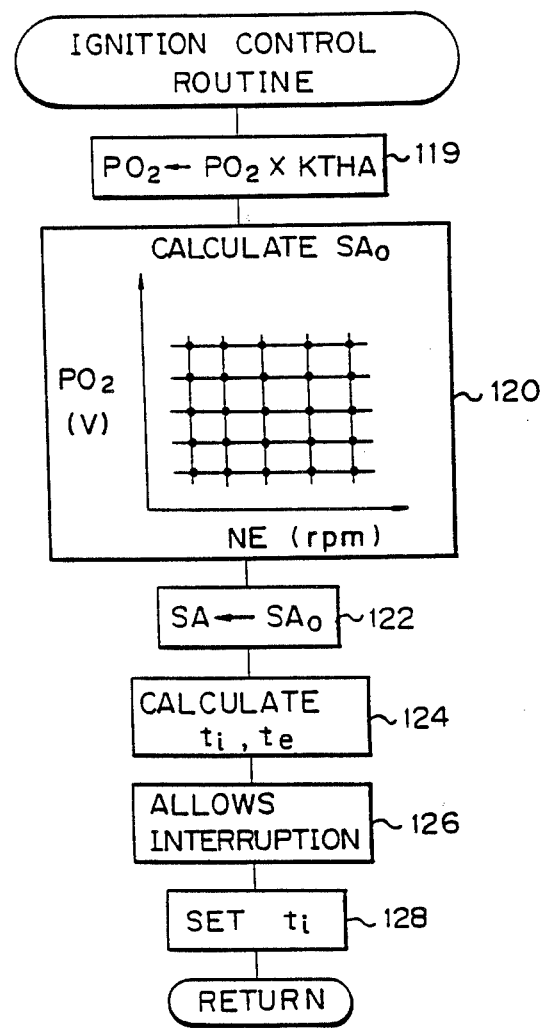
FIGS. 11 and 12 are flowcharts illustrating the ignition control operations in a control circuit in FIG. 1; and, FIGS. 13(a), 13(b) and 13(c) are timing illustrating the ignition control operation of the control circuit in FIG. 1.
Figure 12:
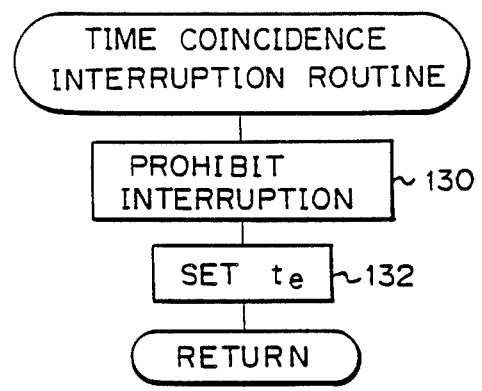

FIG. 11 illustrates an ignition control routine which is commenced by detecting a crank angle before an ignition timing located before the top dead center of the piston in the compression stroke. The detection of this crank angle for commencing the routine is executed in the same way as that of the injection routine described above, by using the pulse signals from the crank angle sensors 56 and 58. At step 119 the value of $PO_2$ is corrected by multiplying therewith a correction factor KTHA which is determined by the intake air temperature as detected. The calculation of KTHA is carried out similarly to the calculation of FTHA at step 101 in FIG. 7 in the first embodiment.

At step 120, a basic ignition timing $SA_0$ is calculated from values of the engine speed NE and output value $PO_2$ of the oxygen sensor 70. This basic ignition timing means an ignition timing at an angle from the TDC, capable of obtaining the maximum engine torque (MBT) from the amount of new air introduced into the engine. When the amount of new air is maintained at a constant value, the timing for obtaining the MBT changes when the engine speed value changes. This means that the ignition timing for obtaining the MBT is determined by combinations of the amount of new air and the engine speed. In the D-J type prior art ignition control system, a map of the basic ignition timing is constructed by combinations of values of the intake pressure PM and the engine speed. According to the present invention, similar to the basic fuel injection amount map, the map of the basic ignition timing $SA_0$ is constructed by combinations of values of the output voltage $PO_2$ of the intake side oxygen sensor 70 corresponding to the amount of new air, and the engine speed. The memory 55b is provided with a map of data of the basic ignition timing, to obtain the MBT with respect to combinations of values of the engine rotational speed and the output voltage level $PO_2$ of the oxygen sensor 70. The MPU 55a executes a map interpolation calculation from an actual value of the engine speed NE detected by adjacent 30 degree CA signals from the second crank angle sensor 58 and the actual value of the output voltage $PO_2$ of the intake side oxygen sensor 70, to obtain a value of the basic ignition timing.

Figure 13A:
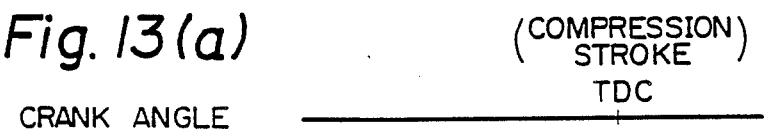
Figure 13B:
Figure 13C:
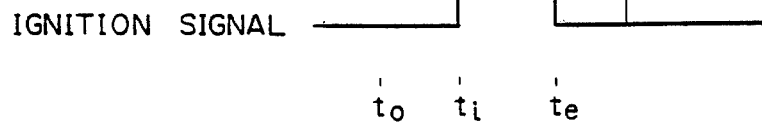

At step 122, a correction of the basic ignition timing $SA_0$ calculated at the step 120 is effected. This correction includes a retard correction of the basic ignition timing in accordance with a value of the engine cooling water temperature THW or a retard correction in accordance with a knocking condition of the engine. By these corrections, a corrected ignition timing SA which is delayed with respect to the basic ignition timing $SA_0$ is obtained. At step 124, a calculation is effected to obtain a timing $t_i$ for a set and reset of the ignition control signal. The calculation of the timing $t_i$ and $t_e$ can be calculated from the viewpoint that the time for a continuation of the ignition signal, i.e., the period T for energizing the ignitor 30a, is determined to obtain a sufficiently strong spark in the spark gap and thus attain a stable ignition, and that the piston is located at the crank angle position spaced at an angle of SA from the TDC position at the timing at which the above mentioned energizing period is completed. See FIG. 13. At step 126, a time coincidence interruption is allowed, and at step 128, the time for raising the ignition signal $t_i$ is set to a not shown comparator, to control the ignition.

Figure 10C:

The present time coincides with the set time $t_i$ during which the ignitor 30a is made ON. At the same time, a time coincidence interruption routine in FIG. 12 is commenced. At step 130, the time coincidence interruption routine is prohibited and, at step 132, the time $t_e$ is set to the comparator. Therefore, when the present time coincides with the set time $t_e$, the ignition signal is made low level so that a high voltage electric current is generated in the spark gap, to commence the ignition. This timing is located at a crank angle position SA from the top dead center. See FIG. 10(c).

The present invention makes it possible to precisely control an engine operating factor influenced by the amount of new air, by directly detecting same, when compared with a conventional D-J system wherein the amount of new air is indirectly detected from the intake pressure. Furthermore, the present invention allows the construction of the control circuit 55 to be simplified, in that only a single map is required for calculating a precise engine operating condition value regardless of whether or not the EGR operation is carried out. The present invention allows a precise control of the engine operating characteristic since the amount of new introduced air is itself detected irrespective of a change in the flow characteristic of the EGR passageway or blow-by gas passageway caused by deposits, which naturally occurs after a prolonged use of the engine. While the embodiment is described with reference to a system provided with an EGR system, the present invention may be also applied to an internal combustion engine not provided with the EGR system.

While an embodiment of the present invention is described with reference to the attached drawings, many modification and changes may be made by those skilled in this art without departing from the scope and spirit of the invention.

We claim:

1. An internal combustion engine comprising:
   an engine body;
   an intake system connected to the engine body for introducing air thereto from outside the engine, the system including a throttle valve for controlling the amount of air introduced;

an exhaust system connected to the engine body for removing resultant combustion gas therefrom;

sensor means arranged in the intake system at a position downstream of the throttle valve, said sensor means being responsive only to the partial pressure of oxygen in the air newly introduced from outside the engine and providing an electrical signal indicating the amount of new air introduced;

calculating means, responsive to the sensed amount of new air introduced, for calculating values of an engine operational characteristic to be controlled as a function of the amount of newly introduced air; and control means, responsive to the calculated engine operational characteristic value, for controlling the engine operational characteristic as a function of the amount of newly introduced air.

2. An internal combustion engine according to claim 1, wherein said engine operational characteristic is an amount of fuel introduced into the engine to obtain a desired air-fuel ratio.

3. An internal combustion engine according to claim 1, wherein said engine operational characteristic is a timing signal for commencing an ignition in the engine.

4. An internal combustion engine according to claim 1, further comprising means for sensing a temperature of the air introduced into the engine, and means for correcting the calculated engine operational characteristic value in accordance with the detected intake air temperature, for attaining a precise control of the operational characteristic.

5. An internal combustion engine according to claim 1, further comprising sensor means for sensing an engine speed, wherein said calculating means calculates the engine operational characteristic value not only from the sensed amount of air introduced but also from the sensed engine speed.

6. An internal combustion engine according to claim 5, wherein said calculating means comprising a map of data of the engine operational characteristic in accordance with combinations of values of an engine speed and amount of air introduced, and interpolation means for interpolating from said map a value corresponding to the sensed engine speed and the sensed amount of air introduced.

7. An internal combustion engine according to claim 6, further comprising a system for recirculating an amount of exhaust gas from the exhaust system to the intake system, said system selectively realizing the exhaust gas recirculation operation in accordance with an engine operating condition, and wherein said map is used for the exhaust gas recirculation operation.

8. An internal combustion engine according to claim 1, wherein said sensor means comprises a limit current type oxygen sensor having a diffusion member made of a ceramic material, a first electrode on one side of the member and in contact with the gas to be detected, and a second electrode on the other side of the member and in contact with a reference air, an ionic current being formed in the diffusion material having a continuously varied level corresponding to the oxygen density in the gas to be detected.

9. An internal combustion engine comprising:
an engine body;
an intake system connected to the engine body for introducing air thereto, the system including a throttle valve for controlling the amount of air introduced;

an exhaust system connected to the engine body for removing resulting combustion gas therefrom;

an exhaust gas recirculating system for connecting the exhaust system to the intake system for selectively recirculating an amount of exhaust gas to the intake system in accordance with a present engine operating condition;

sensor means arranged in the intake system at a position downstream of the throttle valve, said sensor means being responsive to the partial pressure of oxygen in the introduced air and providing an electric signal indicating the amount of air introduced;

means for storing data of an amount of fuel to be introduced into the engine in accordance with a value of the amount of new air introduced, said data being determined and adapted for the exhaust gas recirculation operation;

calculating means, responsive to the sensed amount of air introduced, for calculating a value of an amount of introduced fuel by using the stored data; and means for introducing the calculated amount of fuel into the engine.

10. An internal combustion engine according to claim 9, further comprising means for sensing a temperature of the air introduced into the engine, and means for correcting the calculated fuel amount in accordance with the detected intake air temperature, to attain a precise control of the air-fuel ratio.

11. An internal combustion engine according to claim 9, further comprising sensor means for sensing an engine speed, wherein said calculating means calculates the introduced fuel amount value not only from the sensed amount of air introduced but also from the sensed engine speed.

12. An internal combustion engine according to claim 11, wherein said calculating means comprises a map of data of the introduced fuel amount in accordance with combinations of values of the engine speed and amount of air introduced, and interpolation means for interpolating from said map a value of the introduced fuel amount corresponding to the sensed engine speed and the sensed amount of air introduced.

13. An internal combustion engine according to claim 9, wherein said sensor means comprises a limit current type oxygen sensor having a diffusion member made of a ceramic material, a first electrode on one side of the member and in contact with the gas to be detected, and a second electrode on the other side of the member and in contact with a reference air, an ionic current being formed in the diffusion material having continuously varied level corresponding to the oxygen density detected in the gas.

14. An internal combustion engine according to claim 1, further comprising another sensor means arranged in the exhaust system of the engine for providing an electric signal indicating an actual air-fuel ratio, and means for a feedback control of the operational characteristic value in accordance with a difference between the actual air-fuel ratio and a target air-fuel ratio.

15. An internal combustion engine according to claim 1, further comprising detecting means for detecting an engine speed, said calculating means comprising means for storing values of a basic fuel injection amount mapped by values of an amount of newly introduced air and an engine speed, and means for calculating a value of the basic fuel injection amount from the stored values, the sensed value of new air introduced, and the detected value of engine speed.

16. An internal combustion engine according to claim 1, further comprising detecting means for detecting an engine speed, said calculating means comprising means for storing values of a basic ignition timing mapped by values of the amount of newly introduced air and an engine speed, and means for calculating a value of the basic ignition timing from the stored values, the sensed value of new air introduced, and the detected value of engine speed.

* * * * *

UNITED STATES PATENT AND TRADEMARK OFFICE
CERTIFICATE OF CORRECTION

PATENT NO. : 4,942,860
DATED : July 24, 1990
INVENTOR(S) : Chujo, Y., et al.

It is certified that error appears in the above-identified patent and that said Letters Patent is hereby corrected as shown below:

Column 2, line 41, change: "timing illustrating" to --timing charts illustrating--.

Column 4, line 11, change: "Fig. 2," to --In Fig. 2,--.

Column 5, line 14, change: "non-linear" to --non-linearity--.

Column 8, line 54, change: "calculate" to --calculated--.

Signed and Sealed this

Twenty-fourth Day of December, 1991

Attest:

HARRY F. MANBECK, JR.

Attesting Officer

Commissioner of Patents and Trademarks